United States Patent
Drebinger et al.

(10) Patent No.: US 7,962,230 B2
(45) Date of Patent: Jun. 14, 2011

(54) SYSTEM INCLUDING AT LEAST ONE AUTOMATION UNIT

(75) Inventors: Andreas Drebinger, Herzogenaurach (DE); Jochen Zingraf, Obermichelbach (DE)

(73) Assignee: Siemens Aktiengesellschaft, Munich (DE)

( * ) Notice: Subject to any disclaimer, the term of this patent is extended or adjusted under 35 U.S.C. 154(b) by 75 days.

(21) Appl. No.: 12/225,621

(22) PCT Filed: Mar. 23, 2007

(86) PCT No.: PCT/EP2007/052819
§ 371 (c)(1), (2), (4) Date: Apr. 7, 2009

(87) PCT Pub. No.: WO2007/113144
PCT Pub. Date: Oct. 11, 2007

(65) Prior Publication Data
US 2009/0222114 A1    Sep. 3, 2009

(30) Foreign Application Priority Data

Mar. 30, 2006 (DE) .......................... 10 2006 015 161

(51) Int. Cl.
G05B 19/42 (2006.01)
G05B 11/01 (2006.01)
G05B 19/18 (2006.01)
G06F 9/44 (2006.01)

(52) U.S. Cl. .............. 700/87; 700/18; 700/86; 700/250; 700/253; 717/100; 717/110

(58) Field of Classification Search .............. 700/17–20, 700/83, 86–87, 250, 253; 340/3.71; 717/100, 717/110
See application file for complete search history.

(56) References Cited

U.S. PATENT DOCUMENTS

| | | | | |
|---|---|---|---|---|
| 4,069,488 A | * | 1/1978 | Fiorenza et al. | 700/169 |
| 4,262,336 A | * | 4/1981 | Pritchard | 700/169 |
| 4,288,849 A | * | 9/1981 | Yoshida et al. | 700/3 |
| 4,459,655 A | * | 7/1984 | Willemin | 700/3 |
| 4,608,645 A | * | 8/1986 | Niwa et al. | 700/176 |
| 4,897,586 A | * | 1/1990 | Nakata et al. | 700/260 |
| 4,979,106 A | * | 12/1990 | Schneider | 713/1 |
| 4,996,658 A | * | 2/1991 | Baker | 702/97 |
| 5,072,374 A | * | 12/1991 | Sexton et al. | 709/208 |
| 5,252,899 A | * | 10/1993 | Kawamura et al. | 318/568.1 |
| 5,387,769 A | * | 2/1995 | Kupersmith et al. | 187/248 |
| 6,169,928 B1 | * | 1/2001 | Olson et al. | 700/7 |
| 6,640,163 B1 | | 10/2003 | Pfaff et al. | |
| 2008/0295114 A1 | * | 11/2008 | Argade et al. | 719/320 |

FOREIGN PATENT DOCUMENTS

EP    1 457 850 A1    9/2004
(Continued)

*Primary Examiner* — Ramesh B Patel (57) ABSTRACT

A system providing control and communication is provided including at least one automation unit being adapted to run an operation program, and an engineering unit being adapted to modify the operation program, the engineering unit including a code-configurator, which is adapted to project automation functions of the operation program in the form of at least one configured data structure and to modify the configured data structure, the at least one automation unit including an interpreter framework, which is adapted to include a catalogue of necessary automation functions of the operation program and an empty data structure, the interpreter framework being further adapted to interpret the modified configured data structure and to provide a modified operation program on the basis of the automation functions of the catalogue and the modified configured data structure.

11 Claims, 12 Drawing Sheets

FOREIGN PATENT DOCUMENTS

| | | |
|---|---|---|
| GB | 1 602 164 A | 11/1981 |
| RU | 2020537 C1 | 9/1994 |
| RU | 2096817 C1 | 11/1997 |
| RU | 2106675 C1 | 3/1998 |
| RU | 2003126941 A | 4/2005 |
| WO | 9303429 A1 | 2/1993 |
| WO | WO9847052 A1 | 10/1998 |

* cited by examiner

FIG 2A

| Initial partner | telegram/job | response partner |
|---|---|---|
| Fit-server | | PLC |
| write engineering data | >>DB_WRITE>><br><<TEL_ACK<< | writing data into DB |
| read engineering data | >>DB_READ>><br><<DB_CONTENT<< | reading data from DB |
| copy engineering data | >>DB_COPY>><br><<TEL_ACK<< | copying data from DB to DB |
| execute new configuration | >>EXECUTE>><br><<TEL_ACK<< | update force references, initiate output ports of new modules, switchover to new cycle DB |
| commit new configuration | >>COMMIT>><br><<TEL_ACK<< | update force list |
| force port | >>FORCE>><br><<TEL_ACK<< | force value, add entry in force list |

FIG 2B

| update force value | >>UPDATE_FORCE_VAL>> | change value of forced port |
| --- | --- | --- |
| | <<TEL_ACK<< | |
| unforce port | >>UNFORCE>> | switch back to original value, remove entry from force list |
| | <<TEL_ACK<< | |
| force parameter | >>FORCE_PAR>> | force value, add entry in force list |
| | <<TEL_ACK<< | |
| update force parameter value | >>UPDATE_FORCE_PAR_VAL>> | change value of forced port |
| | <<TEL_ACK<< | |
| unforce parameter | >>UNFORCE_PART>> | switch back to original value, remove entry from force list |
| | <<TEL_ACK<< | |
| change parameter value | >>CHANGE_PARA>> | change parameter value |
| | <<TEL_ACK<< | |

FIG 3A

| Initial partner | telegram/job | response partner |
|---|---|---|
| Fit-server | | PLC |
| subscribe ports | >>SUBSCR_HMI>> <<TEL_ACK<< | add entries to bundler list, send values |
| unsubscribe ports | >>UNSUBSCR_HMI>> <<TEL_ACK<< | delete entries from bundler list |
| unsubscribe all ports | >>UNSUBSCR_ALL>> <<TEL_ACK<< | delete all entries from bundler list |
| get value | >>GET_VALUE>> <<TEL_ACK<< | send requested value |
| operate binary value | >>OPERATE_VAL_BIN>> <<TEL_ACK<< | change value, send value |
| operate analogue value | >>OPERATE_VAL_ANA>> <<TEL_ACK<< | change value, send value |
| acknowledge alarm | >>ACK_ALARM>> <<TEL_ACK<< | set acknowledge bits, send value |

FIG 3B

| suppress alarm | >>SUPP_ALARM>> | set suppress bits, send value |
| --- | --- | --- |
| | <<TEL_ACK<< | |
| ptp binary value from java rc | >>PTP_VAL_BIN>> | change value |
| | <<TEL_ACK<< | |
| ptp analogue value from java rc | >>PTP_VAL_ANA>> | change value |
| | <<TEL_ACK<< | |
| general request | >>GEN_REQUEST>> | set general request bits in life beat tel., send all archive values or alarms |
| | <<TEL_ACK<< | |

FIG 4

| Initial partner | telegram/job | response partner |
|---|---|---|
| PLC | | ft-server |
| send subscribed values | >>PROCESS_VALUES>> | |
| | | forward values |
| | <<TEL_ACK<< | |
| send archive values | >>ARCHIVE_VALUES>> | |
| | | forward values |
| | <<TEL_ACK<< | |
| send cyclic life beat | >>LIFE_BEAT>> | process life beat data |
| | <<TEL_ACK<< | |

FIG 5

| Initial partner | telegram/job | response partner |
|---|---|---|
| PLC | | ft-server |
| send alarms | >>ALARMS>> | |
| | | forward alarms |
| | <<TEL_ACK<< | |

SYSTEM INCLUDING AT LEAST ONE AUTOMATION UNIT

CROSS REFERENCE TO RELATED APPLICATIONS

This application is the US National Stage of International Application No. PCT/EP2007/052819, filed Mar. 23, 2007 and claims the benefit thereof. The International Application claims the benefits of German application No. 10 2006 015 161.5 filed Mar. 30, 2006, both of the applications are incorporated by reference herein in their entirety.

FIELD OF INVENTION

The invention refers to a control and communication system including at least one automation unit being adapted to run an operation program, and an engineering unit being adapted to modify the operation program. Further, the invention refers to a method of modifying an operation program of at least one automation unit of a control and communication system, the control and communication system further including an engineering unit being adapted to modify the operation program of the corresponding automation unit.

BACKGROUND OF THE INVENTION

Automation of machinery equipment or plants, such as power plants, demands flexible and multi-purpose control and communication systems, in order to project the increasingly complex adjustment and control objects, in order to put them into operation and in order to adapt them to changing terms and conditions.

Although many efforts have been made in order to receive such control and communication systems, known systems are still considered to include too many inflexible rules and to be too complicated in programming and modifying of the corresponding operation programs.

SUMMARY OF INVENTION

Accordingly, it is an object of the present invention to provide a control and communication system and a method for modifying an operation program of such a system, which are much easier to amend. Meanwhile, the system and method have to keep the presently known low standard of error probability and it should be possible to provide the system and the method on the basis of presently known automation units, such as those of the well known SIMATIC family.

The object underlying the invention is solved by a control and communication system including at least one automation unit being adapted to run an operation program, and an engineering unit being adapted to modify the operation program, the engineering unit including a code-configurator, which is adapted to project automation functions of the operation program in the form of at least one configured data structure and to modify the configured data structure, the at least one automation unit including an interpreter framework, which is adapted to include a catalogue of predefined, necessary automation functions of the operation program and an empty data structure, the interpreter framework being further adapted to interpret the modified configured data structure and to provide a modified operation program on the basis of at least one of the automation functions of said catalogue and the modified configured data structure. The configured data structure in particular contain pointers and values and is used in the interpreter framework to point at the relevant automation functions (already provided in the said catalogue of the interpreter framework) and to fill them with the appropriate values.

In other words, the invention provides a projection of automation functions of an automation unit in the form of at least one configured data structure. This data structure just contains data, but no functions in the common form. The configured data structure is interpreted at the automation unit by assigning corresponding automation functions from a catalogue of automation functions, which was previously included at the automation unit. By doing so, the invention enables a modification of projected automation functions at automation units, which achieves very short times required for generating and downloading of the modifications.

The solution according to the invention particularly suitable for control and communication systems of plants, such as power plants, in which the at least one automation unit and the engineering unit are each connected to a common communication bus of a peer-to-peer communication network.

In a preferred embodiment of the invention, the engineering unit is adapted to send the at least one modified configured data structure to the at least one automation unit by means of the corresponding interpreter framework. Accordingly, the interpreter framework additionally provides the functions of an interface between the engineering unit and the corresponding automation unit.

Further preferred, the engineering unit is adapted to include a structural image of the operation system of the at least one automation unit. The structural image may serve as a basis for the projection of automation functions of the operation program of the corresponding automation unit in the form of said at least one configured data structure.

The at least one automation unit is advantageously adapted to switch to the modified operation program while keeping the previous running operation program in a corresponding buffer. Alternatively or additionally, the modified configured data structure is kept in a corresponding buffer of the engineering unit or the corresponding automation unit.

The at least one automation unit further advantageously includes a running operation program and is adapted to switch to the modified operation program while running said operation system.

The object of the invention is further solved by a method of modifying an operation program of an automation unit of a control and communication system, the control and communication system further including an engineering unit being adapted to modify the operation program, the method including the steps of projecting automation functions of the operation program in the form of at least one configured data structure and modifying the configured data structure in the engineering unit, providing a catalogue of predefined, necessary automation functions of the operation program and an empty data structure in the at least one automation unit, sending the modified configured data structure to the at least one automation unit, interpreting the modified configured data structure at the at least one automation unit, and providing a modified operation program at the at least one automation unit on the basis of at least one of the automation functions of said catalogue and the modified configured data structure.

In a first preferred embodiment, said method includes the step of sending the modified configured data structure to the at least one automation unit by means of the automation functions provided in the corresponding automation unit.

In a second preferred embodiment, said method includes the step of including a structural image of the operation system of the at least one automation unit in the engineering unit.

Further preferred, the method according to the invention includes the step of switching to the modified operation program in the at least one automation unit while keeping the previous running operation program in a corresponding buffer.

Also preferred, said method includes the step of running an operation program in the at least one automation unit and switching to the modified operation program while running said operation system.

By means of the solution according to the invention a shock-free modification of operation programs in running automation units can be provided, i.e., the modification can be done without interruption or impact on the running process. New functions can be added to the process, internal switchings and parameters can be amended, and functions can be moved to other program cycles.

Short "turnarounds" or switching times (according to the invention only some seconds are typical) can be achieved for providing the modified operation program in the corresponding automation unit in an executable manner.

At the automation unit even the previous operation program can be rebuild or restored in a shock-free manner after modifications had been made on the basis of the modified configured data structure. It is only necessary to switch to the old data structure, which points to the previous automation functions and includes values for the previous operation program.

The solution of the invention further enables a simulation of any user-defined input and/or output values in process circuitry without loosing the possibility to display the actual process value of the equipment. The user defined value may be inserted in the configured data structure instead of the actual process value and may thus form the basis for a simulation of such value in the following automation function.

A consistency check may be provided on the basis of the solution according to the invention, which allows to find inconsistencies, e.g. because of communication malfunctions or manually made amendments, before placing the projected modifications into the corresponding automation unit.

In addition, the invention provides the basis for an automatic dispatching of automation functions in corresponding timeframes, in order to receive a balanced processor load of the automation units for the different and various operation cycles.

The communication between the engineering unit and the interpreter framework of the at least one automation unit according to the invention may further be used for a kind of integrated communication mechanism which allows to exchange process signals (in particular for operation of the automation units and/or for human/machine interfaces (hmi)) even across several automation units without needing an additional projection of such signal transfers.

Further, said communication may be used for an integrated alarm handling of binary output signals without any additional circuit. The binary output signals may simply be addressed by an appropriate automation function which is to be included in the interpreter framework and may be paged thereafter by a corresponding pointer in the configured data structure of the engineering unit.

Finally, the solution according to the invention may provide an integrated quality code for each signal, in that the configured data structure does not only address a particular automation function but does further provide quality data for the corresponding signal which are used in the automation function for a quality check.

Thus, according to the invention a completely new operation system was configured in the automation unit and a corresponding code generator was developed in the engineering unit. The projected automation functions are entirely described in the form of data, a time consuming generating of functions is not necessary. The automation unit interprets the configured data structures. The interpretation of the operation structures forms the core or basis for the realisation of functions of the operation program.

The engineering system particularly receives a complete image of the operation structures deposited in the automation unit and configures the necessary data structures in the case of an activated projecting modification. Thereby all necessary amendments are transferred to the automation unit in parallel to the running operation program. Upon consistent and complete transfer of all data, the engineering unit will switch the automation unit to the modified operation structure. In this way a negative impact on the running operation program can be ruled out.

The interpreter framework is loaded once at the initialisation of the automation unit and provides its services thereafter. The engineering unit uses the services of the interpreter framework for the transfer of the configured projecting data, thereby defining the functioning of the interpreter framework. As the interpreter framework includes all necessary functions and also the empty data structures, an extensive loading of further data components during activation of the projecting structures is not needed.

BRIEF DESCRIPTION OF THE DRAWINGS

A preferred embodiment of a control and communication system and a method of modifying an operation program of an automation unit of a control and communication system according to the invention is described hereinafter referring to the enclosed schematical drawings, in which.

DETAILED DESCRIPTION OF INVENTION

Figure 1:
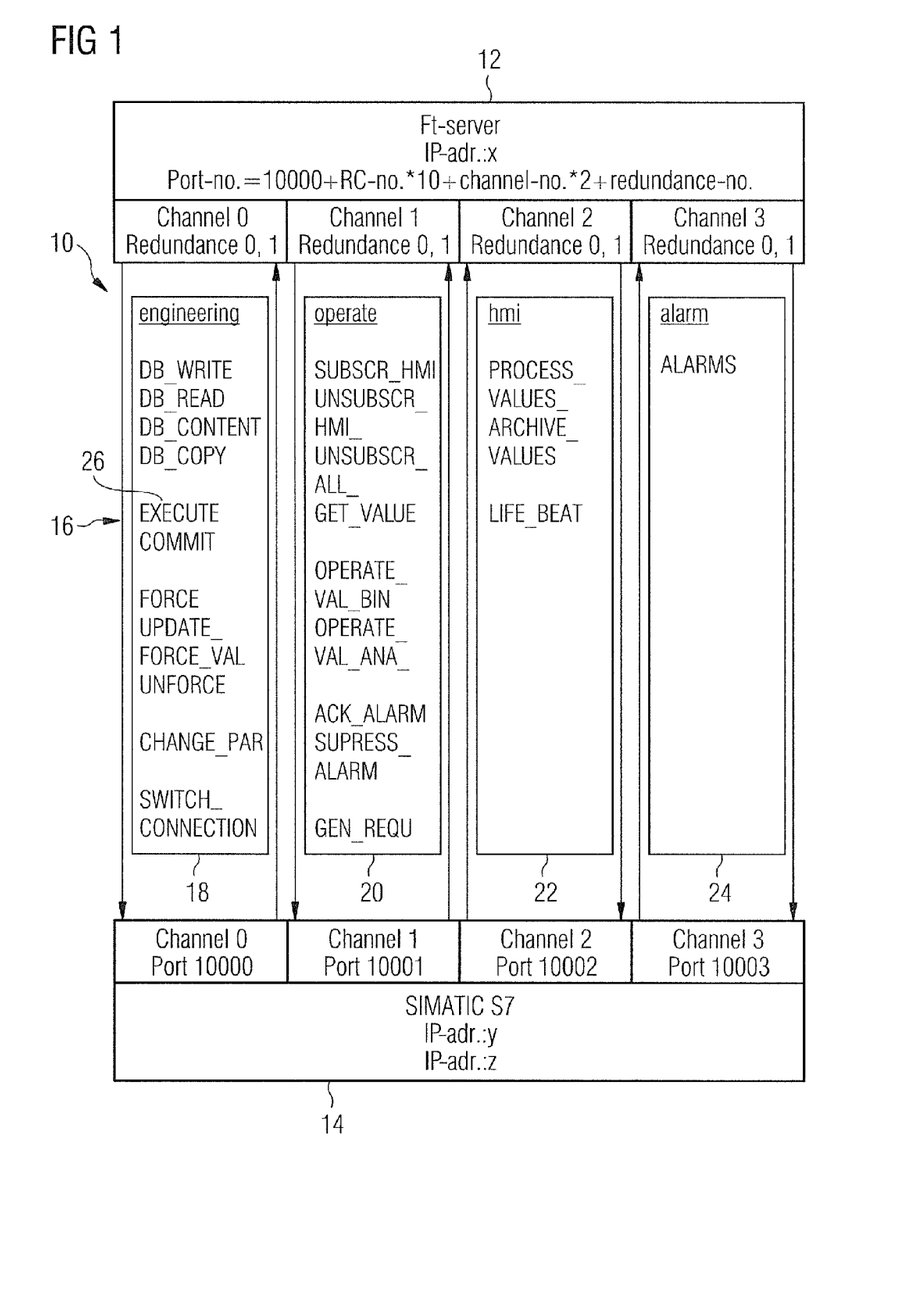
FIG. 1 shows a diagrammatic depiction of an embodiment of a control and communication system according to the invention.

In FIG. 1 a control and communication system 10 is shown, which includes an engineering unit 12 or server (Ft-server) and a number of automation units 14 in the form of SIMATIC S7 control units (only one is shown in FIG. 1). The engineering unit 12 is operatively connected to the automation unit 14 via a peer-to-peer network 16, wherein the communication includes four redundant channels 18, 20, 22 and 24 (channel-no. 0, 1, 2, 3; redundance-no. 0, 1). The units 12 and 14 are thereby each addressed by means of IP-addresses (IP-adr.) and the channels 18 to 24 are accessible through appropriate ports (Port-no.) of the units 12 and 14.

Via the first channel 18, the so called engineering-channel, signals, telegrams and/or jobs for the installation and modification of operation programs of the automation units 14 are transferred. The second channel 20, the so called operate-channel, serves for transferring signals, telegrams and/or jobs for the actual operation of the automation unit 14. The third channel 22, the so called hmi-channel, is used for a human/machine interface (hmi) between the engineering unit 12 and the corresponding automation unit 14. Finally, the forth channel 24, the so called alarm channel, provides alarm handling between the automation unit 14 and the engineering unit 12.

As will be described in further detail hereinafter, the channels 18 to 24 provide a kind of integrated communication between the engineering unit 12 and the corresponding automation unit 14, which allows to exchange process signals (in particular for modifying operation programs, for operation of the automation units, for human/machine interfaces (hmi) and/or for alarm signals) even across several automation units without needing an additional projection of such signal transfers.

Figure 2A:
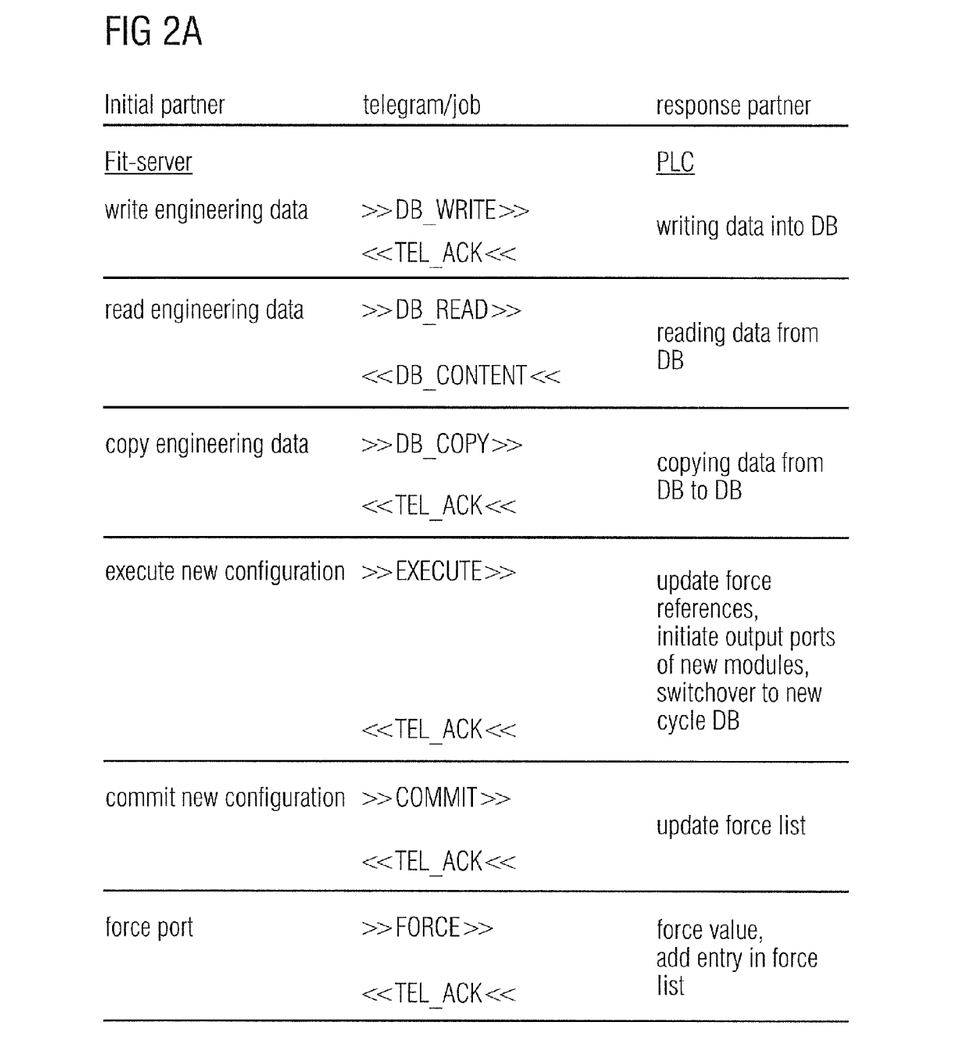
FIGS. 2a and 2b show a first list of telegrams or jobs which are exchangeable between partners of the control and communication system according to FIG. 1, FIGS. 3a and 3b show a second list of telegrams or jobs which are exchangeable between the partners of the control and communication system according to FIG. 1.
Figure 2B:
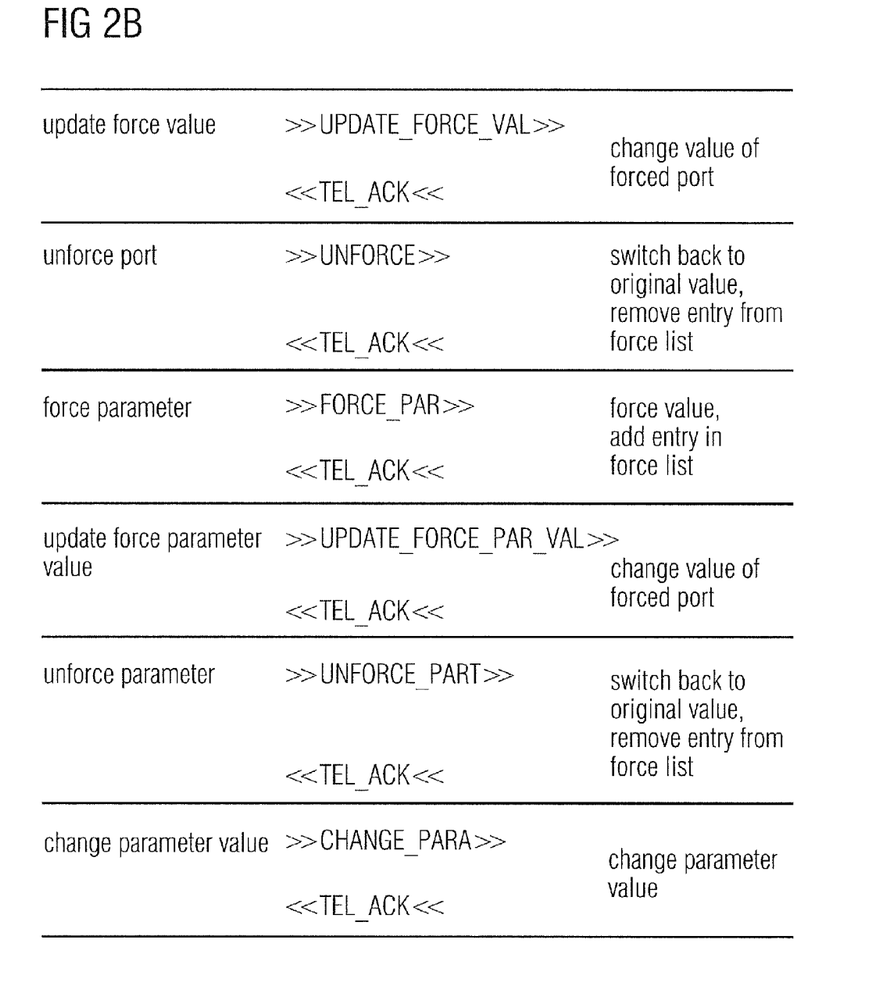

In FIG. 2a, 2b a list of those signals 26 (in the form of telegrams or jobs) is shown, which are transferred between the engineering unit 12 (Ft-server) and the corresponding automation unit 14 (programmable logical controller, PLC) during the installation and modification of operation programs of the automation unit 14.

The signals 26 include, e.g., an initiation or activation of a new configuration of an automation program by means of a signal >>EXECUTE>>. The signal is confirmed by the automation unit 16 with a telegram acknowledgement via a signal <<TEL_ACK<<. The telegram acknowledgement serves a an integrated quality code for providing a quality check of the communication.

Figure 3A:
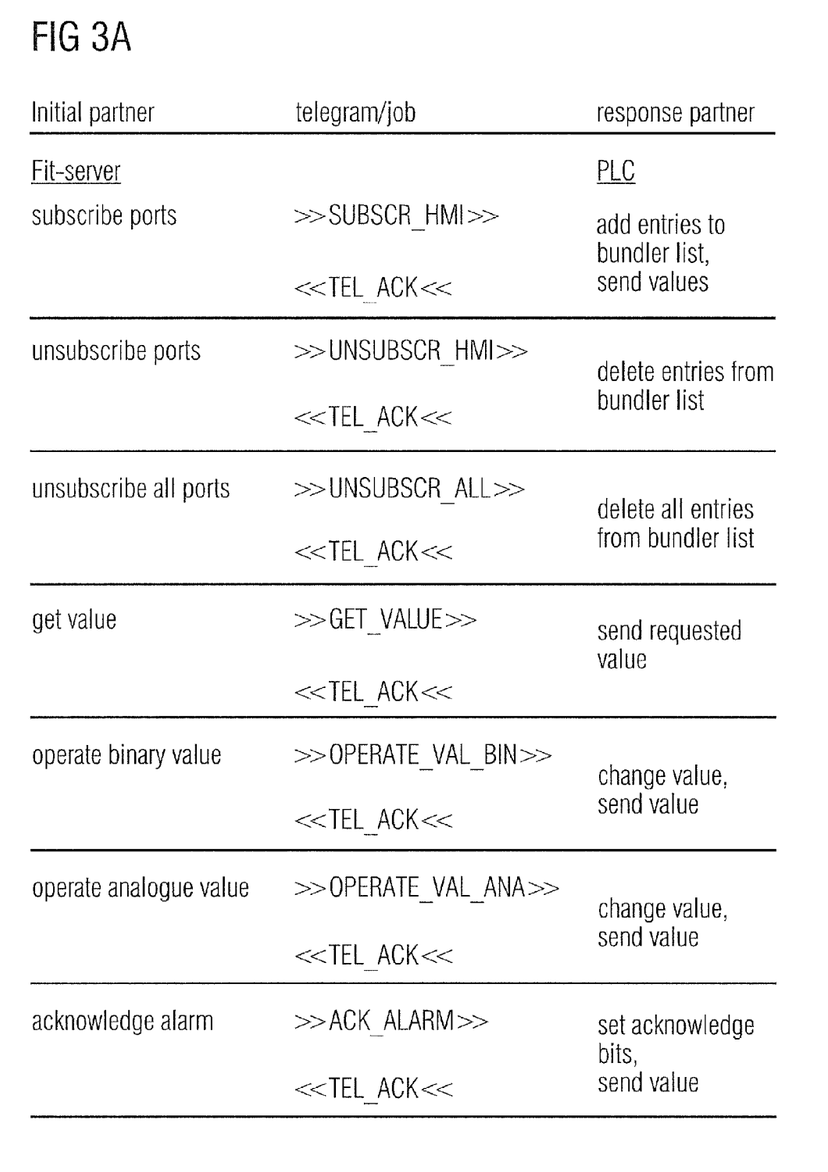
Figure 3B:
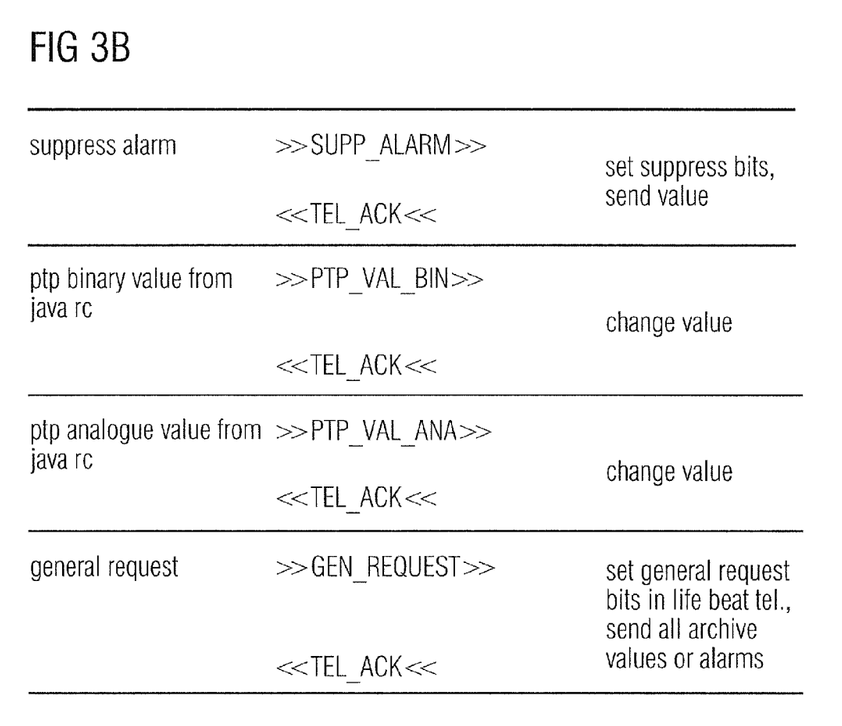
Figure 4:
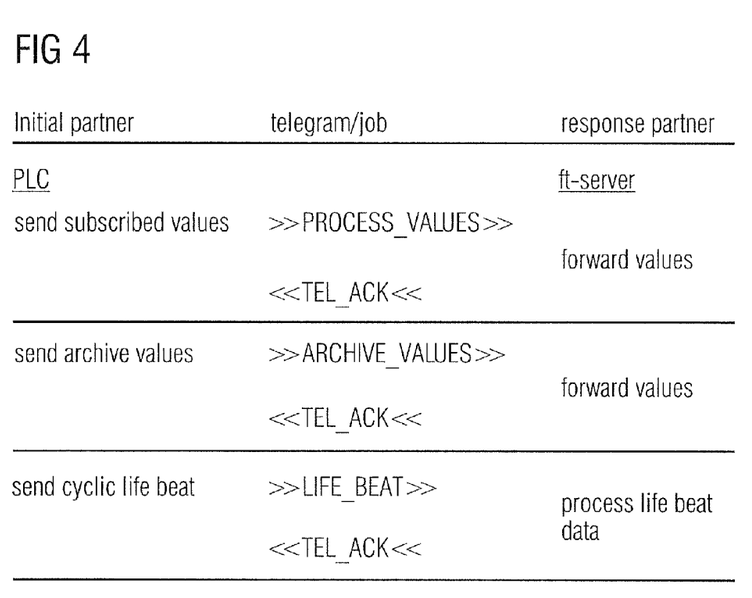
FIG. 4 shows a third list of telegrams or jobs which are exchangeable between the partners of the control and communication system according to FIG. 1.
Figure 5:
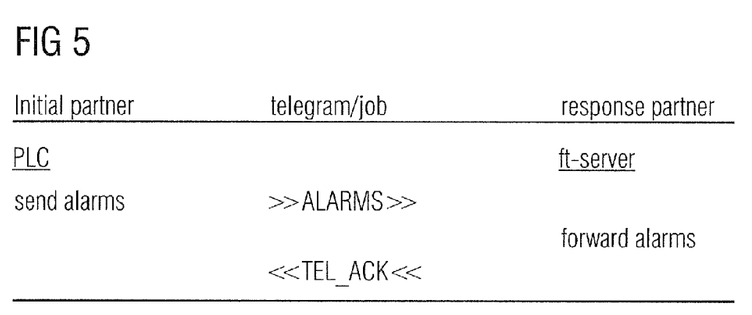
FIG. 5 shows a forth list of telegrams or jobs which are exchangeable between the partners of the control and communication system according to FIG. 1.

FIGS. 3a and 3b show a list of those signals 26 which are transferred between the engineering unit 12 and the corresponding automation unit 14 during the actual operation of the automation unit 14. FIG. 4 shows the corresponding human/machine interface signal transfer, and FIG. 5 shows the signal transfer in the case of an alarm during operation.

Figure 6:
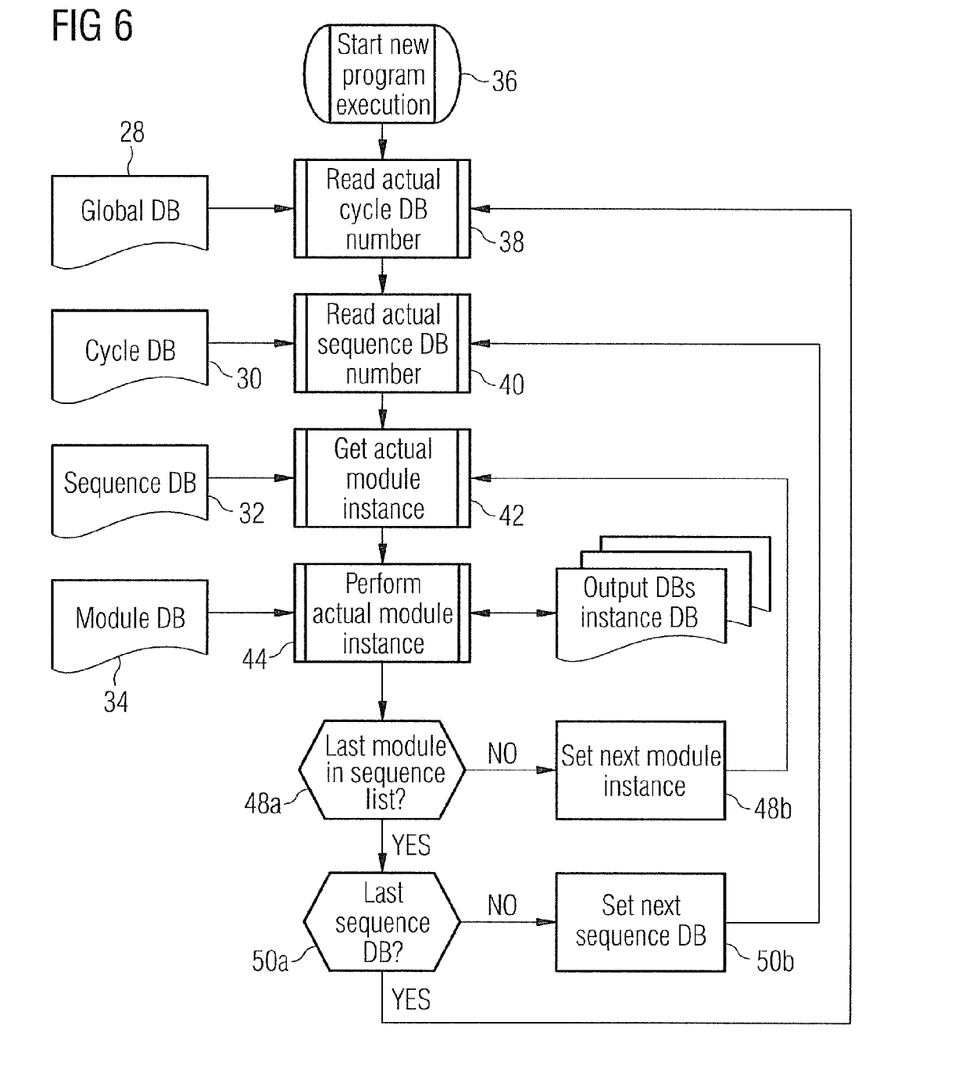
FIG. 6 shows a diagrammatic depiction of an embodiment of a method of modifying an operation program of an automation unit of a control and communication system according to FIG. 1.

In FIG. 6 a diagrammatic partial depiction of the method of modifying an operation program of the automation unit 14 of the control and communication system 10 according to FIG. 1 is shown.

It is an important aspect of the method, that the new or modified operation program is not developed in its entirety at the engineering unit 12 and is transferred to the automation unit 14 thereafter, but that it is developed in the form of a configured data structure including just pointers and values, but not entire functions. The pointers and values are interpreted by a interpreter framework, which forms a part of the automation unit 14, but is not depicted in FIG. 6 in detail. FIG. 6 just shows the processes of this interpretation of the configured data structure provided by the engineering unit 12 in principle.

First, the engineering unit 12 provides a number of data components (DB) at the interpreter framework of the automation unit 14, in particular a Global DB 28, a Cycle DB 30, a number of Sequence DBs 32, and a Module DB 34. When starting a new program execution (e.g., via the signal 26 <<EXECUTE<<) at a step 36, first, an actual cycle DB number is read in a step 38 from the Global DB 28. Thereafter, an actual sequence DB number is read in a step 40 from the appropriate Cycle DB 30. The next step 42 reads an actual module instance from the appropriate Sequence DB 32.

Based on these information, an actual module instance is performed thereafter in a step 44, using data from the Module DB 34 and providing outputs into Output DBs 46 (and an Instance DB).

The next steps 48a, 48b and 50a, 50b check whether the last module in the sequence list and/or the last Sequence DB 32 are reached and repeat the appropriate steps 38 to 44, accordingly.

By doing so, the actual automation functions of the operation program of the automation unit 14 are generated via an interpretation of the data structure of the data components 28, 30, 32 and 34, which was provided (in a first-time or modified manner) by the engineering unit 12.

Figure 7:
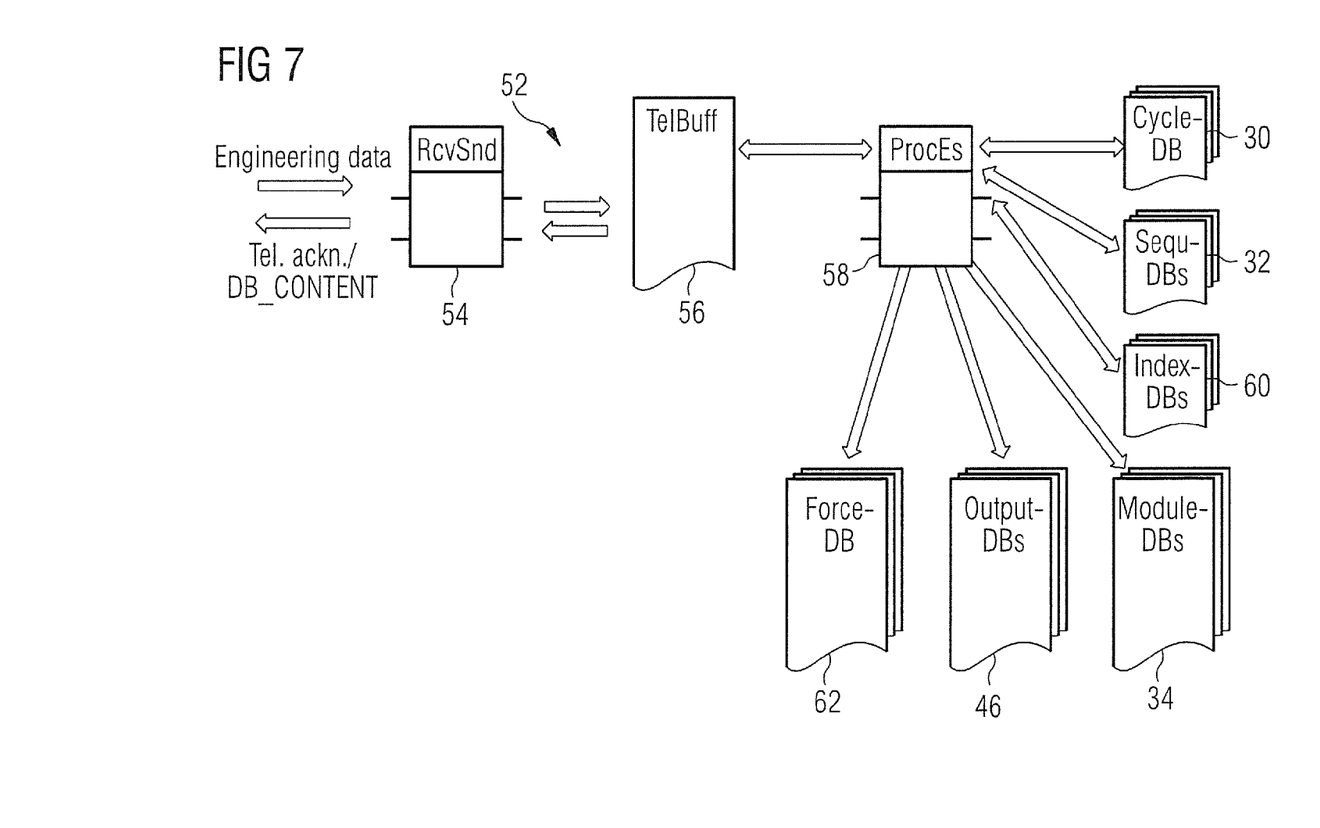
FIG. 7 shows a diagrammatic depiction of the proceeding in the corresponding automation unit during the method according to FIG. 6.

FIG. 7 shows an above mentioned interpreter framework 52 in further details. The interpreter framework 52 includes a process 54 (RCvSnd) for receiving and sending data to a telegram buffer 56 (TelBuff). The telegram buffer 56 communicated with a process 58 (ProcEs) for processing engineering services. The process 58 handles the actual reading and writing of data components, such as a Cycle DB 30, a number of Sequence DBs 32, and a number of Module DBs 34. The process 58 further addresses a number of Index DBs and a Force-DB 62 and writes data to the Output DBs 46. The corresponding telegrams are received by the interpreter framework 52 over the engineering channel 18 and contain one or more jobs. These jobs are processed by the interpreter framework 52. In errorless case a positive acknowledgement telegram is sent back. E.g., the answer for a signal or telegram DB_READ is a DB_CONTENT telegram.

Figure 8:
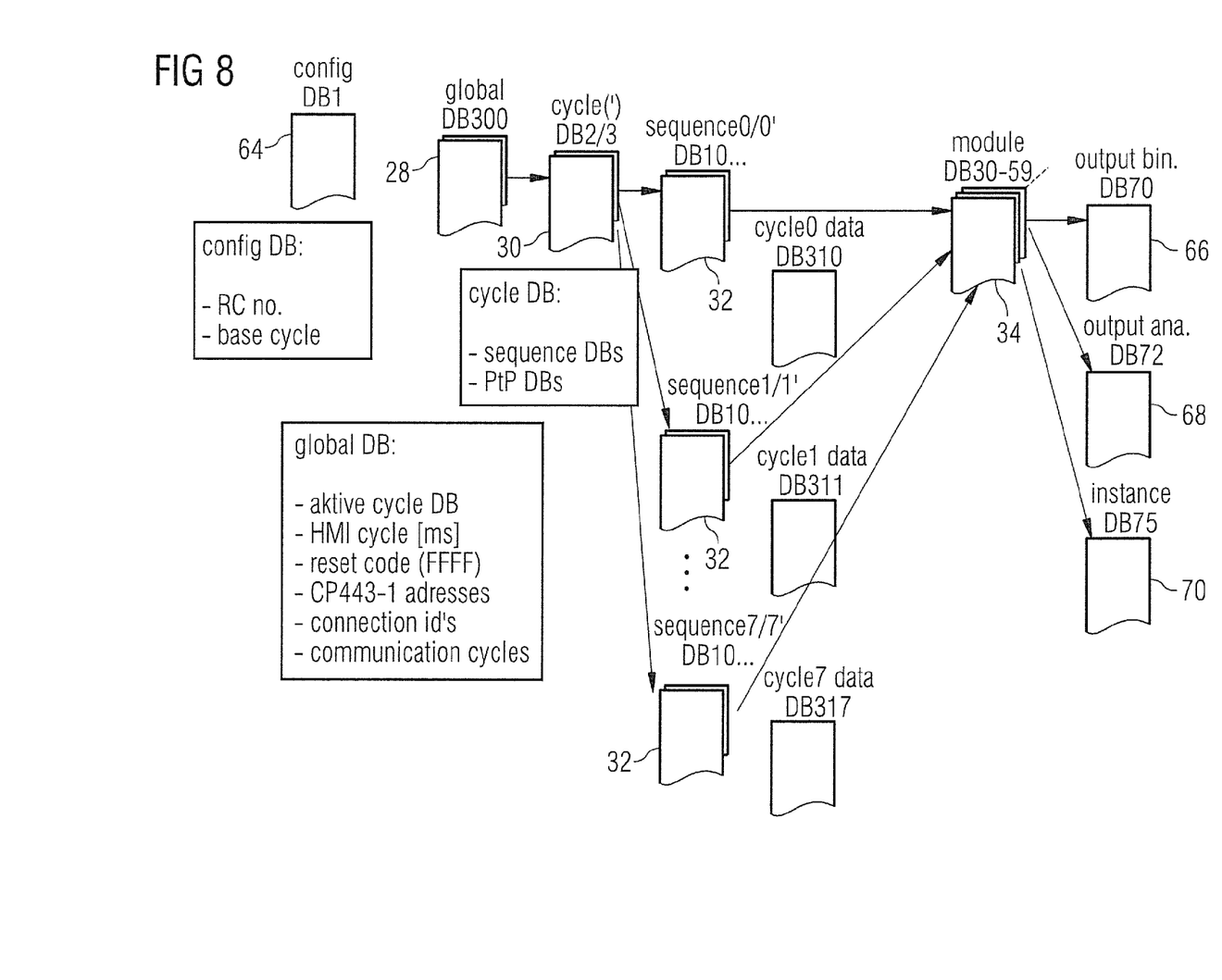
FIG. 8 shows a first diagrammatic depiction of the content of data components during the proceeding according to FIG. 7.
Figure 9:
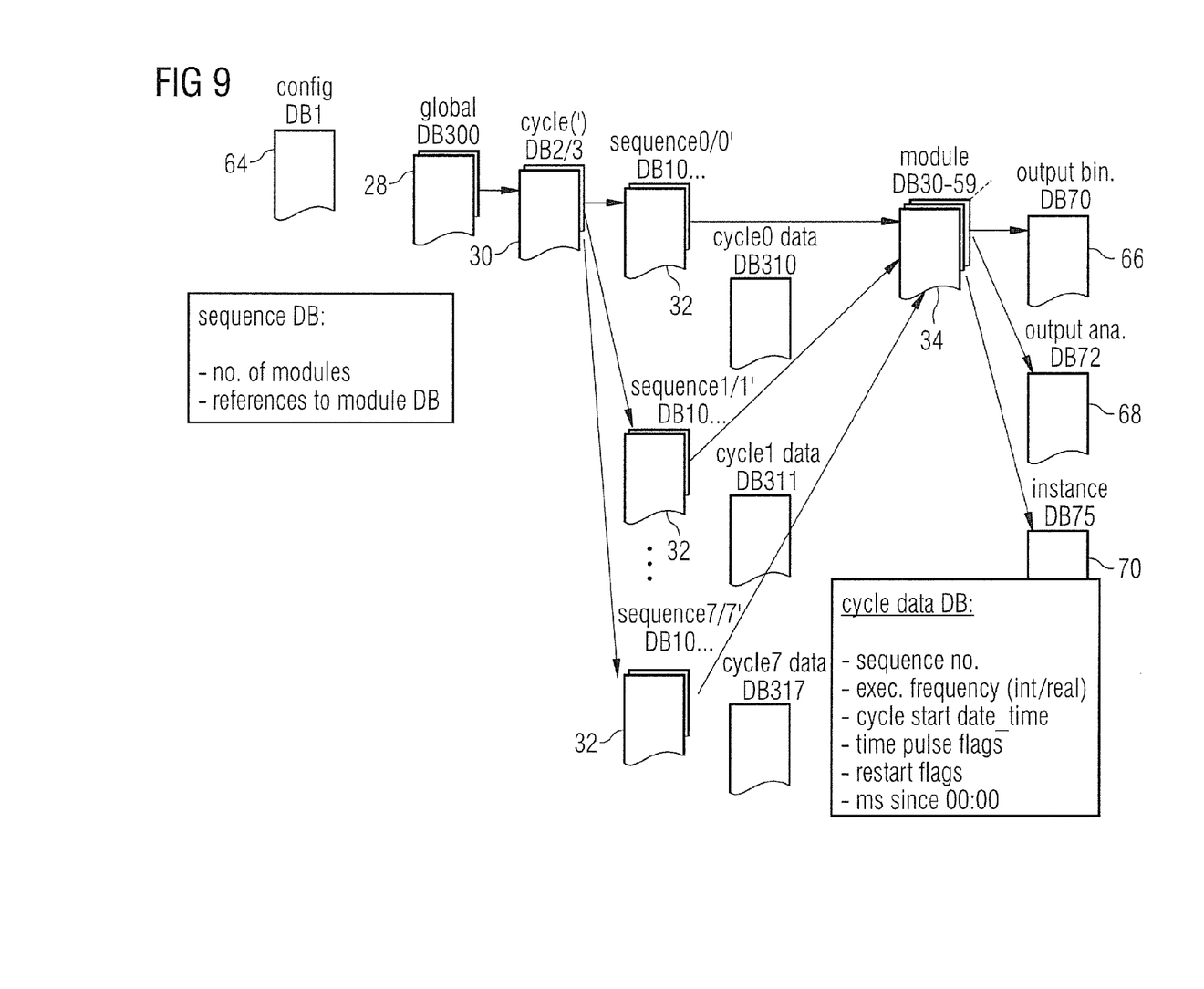
FIG. 9 shows a second diagrammatic depiction of the content of data components during the proceeding according to FIG. 7.
Figure 10:
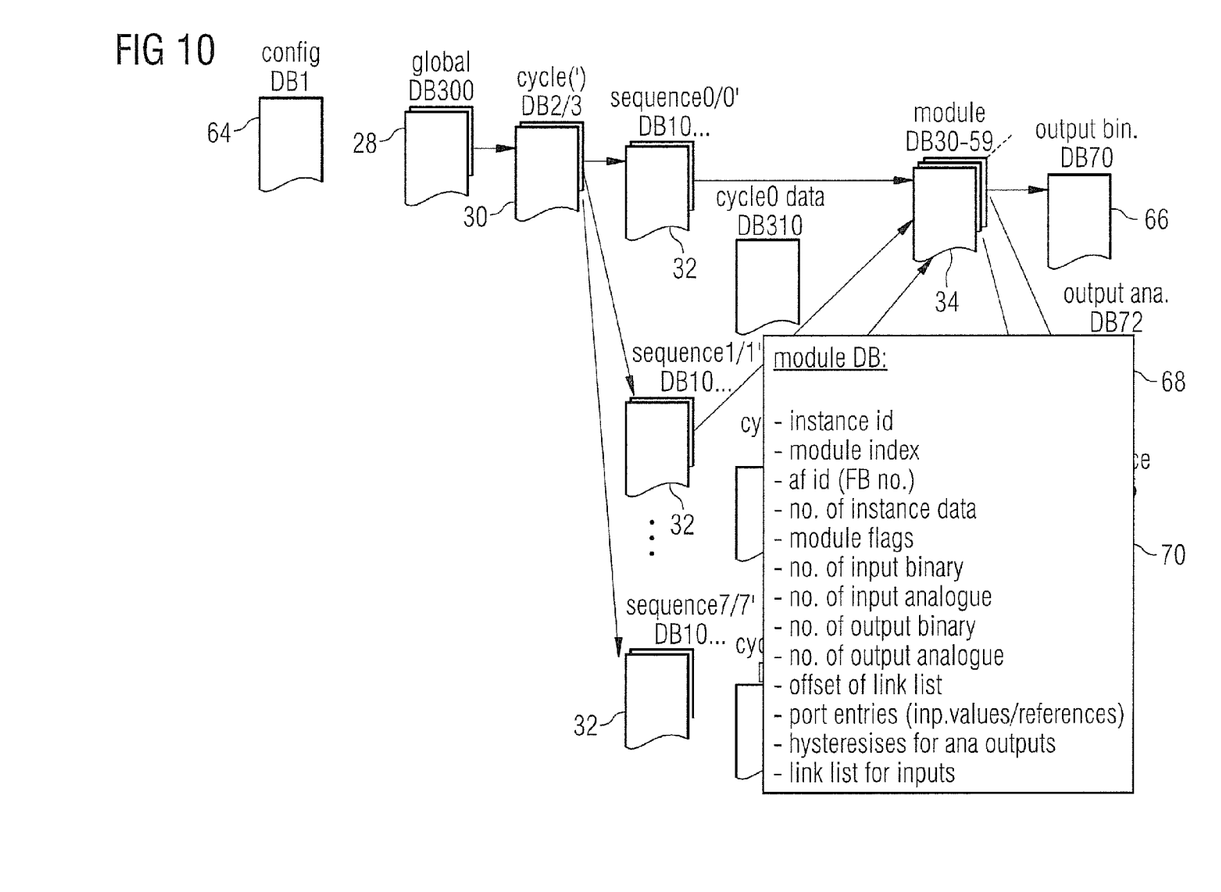
FIG. 10 shows a third diagrammatic depiction of the content of data components during the proceeding according to FIG. 7

FIG. 8 to FIG. 10 are provided for further explaining the process of interpretation in the corresponding automation unit 14. The process is based on a configuration data component 64 (config DB1), which includes an individualizing RC number and a base cycle. These data are processed taking into account data from said Global DB 28 and the number of Cycle DBs 30. The included data are in particular information about the cycles to be processed and the sequences within the cycles. Further, the traffic in the peer-to-peer network is addressed via pear-to-peer (PtP) data components. The sequences refer via pointers (depicted by arrows) to modules of the Module DBs 34, in which the actual instance data are stored.

Figure 11:
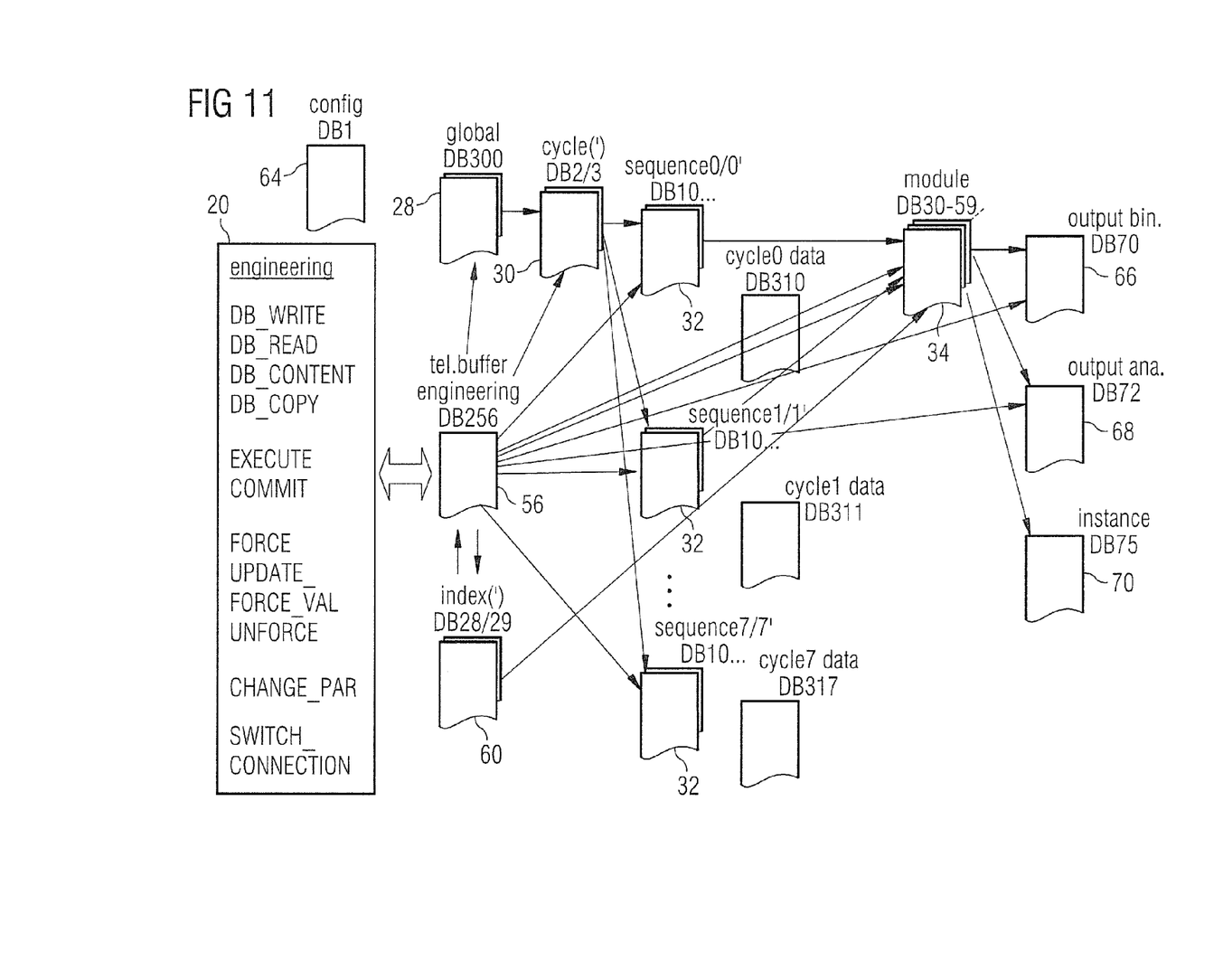
FIG. 11 shows a diagrammatic depiction of the communication between the partners of the control and communication system according to FIG. 1.

As finally summarized in FIG. 11, the catalogue of pre-defined necessary automation functions provided in the interpreter framework 52 in combination with the library of data components provided by the engineering unit 12 is thus translated via said sequence date, said cycle data and said instance data to a running operation program which is stored in a output binary DB 66, a output analogue DB 68 and an instance DB 70.

The invention claimed is:

1. A system providing control and communication, comprising:
   at least one automation unit adapted to run an operation program; and
   an engineering unit adapted to modify the operation program;
      wherein the at least one automation unit includes an interpreter framework, adapted to include a list of necessary automation functions of the operation program and an empty data structure,
      wherein the interpreter framework is further adapted to interpret the modified configured data structure and to provide a modified operation program based on the automation functions of a list and the modified configured data structure; and
      wherein the engineering unit includes a code-configurator, which is adapted to project automation functions of the operation program in the form of at least one configured data structure and to modify the configured data structure.

2. The system according to claim 1, wherein the engineering unit is adapted to send the at least one modified configured data structure to the at least one automation unit via the corresponding interpreter framework.

3. The system according to claim 2, wherein the engineering unit is adapted to include a structural image of the operation system of the at least one automation unit.

4. The system according to claim 3, wherein the at least one automation unit is adapted to switch to the modified operation program while keeping the previous running operation program in a corresponding buffer.

5. The system according to claim 4, wherein the at least one automation unit includes a running operation program and is adapted to switch to the modified operation program while running the operation system.

6. The system as claimed in claim 1, wherein the automation unit and engineering unit are connected to a common communication bus of a peer-to-peer communication network.

7. A method of modifying an operation program of an automation unit of a system providing control and communication, comprising:
   providing an engineering unit adapted to modify the operation program;
   projecting automation functions of the operation program in the form of at least one configured data structure and modifying the configured data structure in the engineering unit;
   providing a list of necessary automation functions of the operation program and an empty data structure in the at least one automation unit;
   sending the modified configured data structure to the at least one automation unit;
   interpreting the modified configured data structure; and
   modifying the operation program based on the automation functions of the list and the modified configured data structure.

8. The method according to claim 7, further comprising sending the modified configured data structure to the at least one automation unit via the automation functions provided in the corresponding automation unit.

9. The method according to claim 8, further comprising including a structural image of the operation system of the at least one automation unit in the engineering unit.

10. The method according to claim 9, further comprising switching to the modified operation program in the at least one automation unit while keeping the previous running operation program in a corresponding buffer.

11. The method according to claim 10, further comprising running an operation program in the at least one automation unit and switching to the modified operation program while running the operation system.

* * * * *